Patented June 26, 1945

2,379,070

UNITED STATES PATENT OFFICE 2,379,070

PIGMENT DISPERSIONS

Peter Bertles Evans, Wynnewood, and William Edwin Scott, Drexel Hill, Pa., assignors to E. I. du Pont de Nemours & Company, Wilmington, Del., a corporation of Delaware No Drawing. Application March 14, 1941,
Serial No. 383,344

2 Claims. (Cl. 260—29)

This invention relates to the dispersion of pigments in resin solutions and more particularly to the dispersion of pigments classified as organophilic and hydrophilic pigments as determined from contact angle measurements.

In the manufacture of synthetic resin enamels e. g. fatty oil modified alkyd resin enamels a customary practice is to disperse, or as more commonly designated grind, the pigment in a portion of the resin solution in a ball or pebble mill. This intermediate product usually designated as a mill base is then further mixed with additional resin solution, solvents, thinners, driers etc. to produce a finished enamel. While this procedure has extensive commercial application difficulty is frequently encountered in obtaining a satisfactorily high gloss and good flowing properties in the finished enamel particularly when it is necessary to use a relatively high pigment to vehicle ratio in the finished product in order to obtain adequate hiding. Since emphasis is quite often placed on high gloss and flow in enamel films it is highly desirable to economically produce enamels which will yield high gloss films and thus adequately meet the demands of the trade.

This invention has as a principal object the provision of means for preparing high gloss and good flow synthetic resin enamels.

A further object is the provision of means for preparing high gloss fatty oil or oil acid modified alkyd resin enamels.

A still further object is the preparation of high gloss fatty oil or fatty oil acid modified alkyd resin enamels having a high pigment to vehicle ratio.

Other objects will be apparent from the detailed description of the invention.

These objects are accomplished by dispersing organophilic pigments in an organophilic solvent solution of the resin and hydrophilic pigments in a hydrophilic solvent solution of the resin with a high pigment to resin ratio.

The classification of pigments as to their position on the organophilic-hydrophilic scale may be determined by the results of measurements of a constant (designated as $Kn_3$) characteristic of each pigment, as described e. g. by Bartell, F. E. and Osterhof, H. J. in J. Ind. and Eng. Chem. 19, 1277 (1927) and Bartell, F. E. and Bartell, L. S., J. Amer. Chem. Soc. 56, 2205 (1934). The classification of solvents (or thinners) as to their position on the organophilic hydrophilic scale may be determined by the results of measurements of the interfacial tensions of the solvents against distilled water according to procedures described e. g. by Harkins, W. D. Jordan, H. F., J. Amer. Chem. Soc. 52, 1751 (1930).

Among organophilic pigments may be noted toluidine red, Hansa yellow, phthalocyanine blue and pigments prepared from organic dyestuffs in general. Some of the organic dyestuff pigments, however, are hydrophilic e. g. those of the metallic salt type. The hydrophilic pigments include those of an inorganic nature usually the oxides, lead chromates and a few of the organic dyestuff type as noted above.

The organophilic solvents are of the paraffin hydrocarbon type, particularly those boiling below 180° C. The higher boiling paraffin hydrocarbon and aromatic hydrocarbon solvents are less strongly organophilic. The strongly hydrophilic solvents include esters, ketones, alcohols, etc. As a very strongly organophilic solvent may be noted varnish makers' and painters' naphtha with a boiling range of 100–167° C. As a strongly organophilic solvent may be noted mineral spirits with a boiling range of 150–215° C. whereas a high solvency petroleum naphtha having a boiling range of 135–190° C. is very weakly organophilic or relatively hydrophilic.

The invention will be more fully understood from the following examples which are given by way of illustration but not by limitation except insofar as defined in the appended claims. The parts are by weight:

EXAMPLE I

A. *Hansa yellow mill base*

|  | Parts |
|---|---|
| Hansa yellow pigment | 33.3 |
| Alkyd resin (solids) | 6.7 |
| High solvency petroleum naphtha | 1.6 |
| Mineral spirits | 3.8 |
| V. M. & P. naphtha | 54.6 |
|  | 100.0 |

This mill base in which the solvent was predominantly of the very strongly organophilic type (V. M. & P. naphtha) was smooth in consistency, easily handled and possessed a clean color. When used in the preparation of a finished enamel it produced such an enamel having a highly satisfactory gloss and possessing other desirable and necessary properties. It will be observed that the pigment to resin ratio in this mill base is approximately 5:1. The common practice of dispersing this pigment is according to the following composition:

|  | Parts |
|---|---|
| B. Hansa yellow pigment | 23.8 |
| Alkyd resin (solids) | 26.2 |
| High solvency petroleum naphtha | 35.0 |
| Mineral spirits | 15.0 |
|  | 100.0 |

The pigment to resin ratio here is 1:1.1 with a much reduced amount of the organophilic solvent. This mill base is badly flocculated, difficult to remove from the mill in which it is dispersed and produces finished enamels of unsatisfactory gloss. As the amount of very strongly organophilic solvent is increased together with an increase in the pigment to resin ratio the satisfactory product of the first formulation above is produced. The small amount of the weakly organophilic solvent in the formula A is introduced with the resin solution and may be, if desired, replaced in the manufacture of the resin with the strongly organophilic solvent viz. V. M. and P. naphtha.

The alkyd resin used in this and subsequent examples was a 52% linseed oil modified glyceryl phthalate. Other non-drying, semi-drying or drying oil or fatty oil acid modified alkyd resins may be used and such modification will be readily apparent to those skilled in the art.

EXAMPLE II

*Fire toner mill base*

|  | Parts |
|---|---|
| Fire toner pigment | 45.2 |
| Alkyd resin (solids) | 6.5 |
| High solvency petroleum naphtha | 1.6 |
| Mineral spirits | 3.8 |
| V. M. & P. naphtha | 42.9 |
|  | 100.0 |

This mill base was prepared as described under Example I. The pigment binder ratio is approximately 7:1. This mill base yields markedly improved dispersion of the pigment, improved flow and improved gloss in the enamels in which it is used over the common mill base of this pigment when dispersed in the presence of weakly organophilic (or hydrophilic) solvents. In the mill base as commonly used the pigment to vehicle ratio is approximately 1.5:1 and the material leaves much to be desired with respect to gloss in films from enamels in which the mill base is used.

As previously noted the small amount of weakly organophilic solvent in the mill base is introduced through the resin solution and may be readily replaced by the strongly organophilic solvent. The use of the small amount is largely a matter of expediency since the resin solutions are usually prepared with these solvents.

EXAMPLE III

*Toluidine red mill base*

In the usual standard procedure for dispersing toluidine red pigment the pigment to vehicle ratio is approximately 1:1 and the solvent used is a mixture of the very weakly organophilic high solvency petroleum naphtha and mineral spirits since these solvents are commonly used in the preparation of the resin solution. When a composition comprising the following is prepared a free, smooth flowing, well dispersed mill base is obtained which when used in finished enamels produces such having a markedly improved and satisfactory gloss over enamels prepared from a mill base made with the weakly organophilic solvent.

|  | Parts |
|---|---|
| Toluidine red pigment | 51.7 |
| Alkyd resin (solids) | 7.4 |
| High solvency petroleum naphtha | 1.8 |
| Mineral spirits | 4.3 |
| V. M. & P. naphtha | 34.8 |
|  | 100.0 |

The pigment to resin ratio in this improved mill base is approximately 7:1, a remarkable increase over the present standard practice.

EXAMPLE IV

*Rubine red toner mill base*

|  | Parts |
|---|---|
| Rubine red toner | 58.6 |
| Alkyd resin (solids) | 9.8 |
| High solvency petroleum naphtha | 26.0 |
| Mineral spirits | 5.6 |
|  | 100.0 |

This mill base is representative of a hydrophilic pigment dispersed in the presence of a weakly organophilic or relatively hydrophilic solvent or thinner with a pigment to resin ratio of approximately 6:1. Enamels prepared from this mill base were clean in color, free flowing and produced films of highly satisfactory gloss characteristics. As commonly prepared in the presence of a strongly organophilic solvent or thinner the pigment to resin ratio is approximately 2:1. As in the examples of the organophilic pigments the conditions for the dispersion must include both an increase in the pigment to resin ratio and the use of a proper solvent or thinner, in this example a weakly organophilic or hydrophilic solvent with the hydrophilic pigment.

EXAMPLE V

*Chromium oxide mill base*

The mill base of this pigment is commonly prepared in the presence of mineral spirits which is a strongly organophilic solvent, has a pigment to resin ratio of 3.9:1, is poor in color and in general produces enamels low in gloss. Chromium oxide is prone to discoloration when dispersed or ground in a ball mill. When this pigment is dispersed in the presence of a preponderant amount of a weakly organophilic or relatively hydrophilic solvent as high solvency petroleum naphtha with increased pigment to resin ratio as, for example, according to the following formulation, a mill base of excellent color and flow is obtained. This mill base produces enamels of excellent color and gloss.

|  | Parts |
|---|---|
| Chromium oxide pigment | 80.9 |
| Alkyd resin (solids) | 5.4 |
| High solvency petroleum naphtha | 10.6 |
| Mineral spirits | 3.1 |
|  | 100.0 |

It will be noted here that the pigment to resin ratio has been increased to approximately 15:1. The small amount of mineral spirits is introduced through the resin solution and may be easily replaced by the high solvency petroleum naphtha.

Example VI

Ferrite yellow mill base

This pigment as commonly dispersed in the presence of a solvent which is strongly organophilic yields a mill base in which the pigment to resin ratio is approximately 2.5:1 and does not produce enamels of satisfactory gloss. If the solvent or thinner is replaced by a weakly organophilic or relatively hydrophilic solvent together with an increase in pigment to resin ratio, a mill base of satisfactory flow and color is produced which in turn yields enamels of excellent gloss when used therein. The following formulation exemplifies such a mill base.

|  | Parts |
|---|---|
| Ferrite yellow pigment | 68.6 |
| Alkyd resin (solids) | 6.8 |
| High solvency petroleum naphtha | 20.8 |
| Mineral spirits | 3.8 |
|  | 100.0 |

Similar results are obtained with the hydrophilic pigment red iron oxide.

While the resinous constituent of the mill in the examples is an alkyd resin other synthetic resins as the urea-formaldehyde type, phenol-formaldehyde type, etc., as well as oleoresinous vehicles may be used in place thereof.

It will be apparent from the above examples that markedly improved mill bases which produce improved enamels in which they are used have been developed. It will be noted that the present invention in using strongly organophilic solvents in the dispensing medium to disperse organophilic pigments is contrary to present known practice. In the present state of the art where low gloss is encountered, it is customary to use so-called richer solvents (hydrophilic) in attempting to obtain better gloss rather than the so-called lean solvents (organophilic) of the low boiling aliphatic type. Furthermore the present invention embodies both a high pigment to resin ratio and the use of an organophilic solvent with an organophilic pigment and a hydrophilic solvent with a hydrophilic pigment. Neither of the conditions alone produces a satisfactory effective result.

In place of the high solvency petroleum naphtha may be used aromatic hydrocarbons in general, such as benzene, toluene, xylene, etc. and in certain instances alcohols, esters, or ketones alone or in admixture. The very strongly organophilic V. M. & P. naphtha may be replaced with similar low boiling aliphatic solvents as, for example, hexane, petroleum ether, Bus naphthas, etc. As preferred organophilic solvents or thinners are those having an interfacial tension against distilled water greater than 35 dynes per centimeter; as hydrophilic or weakly organophilic solvents or thinners, those having an interfacial tension against distilled water of 35 dynes per centimeter or less.

The choice of the particular solvent or solvents will depend on varying conditions and may be made with discretion so long as it meets the requirements of the classification as an organophilic or hydrophilic solvent.

The present invention presents as principal advantages improved gloss in films prepared from enamels in which the mill bases are used; marked reduction or practical elimination of discoloration of the pigment during the dispersion due to the higher dispersion consistencies possible with consequent reduction in abrasion of the steel balls; and reduction in manufacturing costs which result from increased pigment concentration of the mill base without any increase in the time of dispersion, commonly termed grinding cycles. Further, a higher degree of dispersion and markedly improved flow is obtained which is subsequently evidenced in the improved quality of the enamels. Other advantages will be readily apparent to those skilled in the art.

It is apparent that many widely different embodiments of this invention may be made without departing from the spirit and scope thereof, and therefore, it is not intended to be limited except as indicated in the appended claims.

We claim:

1. A mill base for preparing a coating composition which yields a high gloss on drying containing in proportion from 5 to 15 parts of pigment and 1 part of a resin as the sole film-forming agent, and in addition thereto a solvent, the said pigment being organophilic and consisting essentially of a non-metallic organic dye, the said solvent being strongly organophilic consisting essentially of paraffin hydrocarbons boiling below 215° C. and having an interfacial tension as against pure water greater than 35 dynes per centimeter.

2. In the process of preparing coating compositions which yield a high gloss on drying from a mill base which contains from 5 to 15 parts of pigment to each part of resin and the resin is the sole film-forming agent, the improvement which comprises dispersing an organophilic pigment consisting essentially of a non-metallic organic dye in a vehicle containing the resin and a strongly organophilic solvent consisting essentially of paraffin hydrocarbons boiling below 215° C. and having an interfacial tension as against pure water greater than 35 dynes per centimeter.

PETER B. EVANS.
WILLIAM E. SCOTT.